(12) United States Patent
Akuta

(10) Patent No.: US 8,622,772 B2
(45) Date of Patent: Jan. 7, 2014

(54) TERMINAL BLOCK AND METHOD OF MOLDING IT

(75) Inventor: Daisuke Akuta, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 42 days.

(21) Appl. No.: 13/404,062

(22) Filed: Feb. 24, 2012

(65) Prior Publication Data

US 2012/0225593 A1   Sep. 6, 2012

(30) Foreign Application Priority Data

Mar. 3, 2011   (JP) .................................. 2011-046477

(51) Int. Cl.
*H01R 9/22* (2006.01)

(52) U.S. Cl.
USPC ......................................................... 439/722

(58) Field of Classification Search
USPC ......... 439/722, 720, 797, 798, 792, 456, 564; 29/884
See application file for complete search history.

(56) References Cited

U.S. PATENT DOCUMENTS

| | | | |
|---|---|---|---|
| 4,003,128 A * | 1/1977 | Dochterman | 29/596 |
| 4,195,194 A * | 3/1980 | Kuster et al. | 174/59 |
| 4,343,529 A * | 8/1982 | Reavis et al. | 439/406 |
| 4,345,806 A * | 8/1982 | McHenney | 439/510 |
| 4,630,882 A * | 12/1986 | Naylor et al. | 439/444 |
| 5,064,384 A * | 11/1991 | Weaver | 439/511 |
| 5,203,724 A * | 4/1993 | Casey | 439/792 |
| 5,326,285 A * | 7/1994 | Maros | 439/717 |
| 5,733,153 A * | 3/1998 | Takahashi et al. | 439/801 |
| 5,795,117 A * | 8/1998 | Onoda | 411/92 |
| 6,036,554 A * | 3/2000 | Koeda et al. | 439/797 |
| 6,612,878 B2 * | 9/2003 | Lias et al. | 439/709 |
| 7,288,866 B2 * | 10/2007 | Kuribayashi et al. | 310/71 |
| 7,527,523 B2 * | 5/2009 | Yohn et al. | 439/564 |
| 7,559,810 B1 * | 7/2009 | Wu | 439/801 |
| 7,785,158 B1 * | 8/2010 | McCoy et al. | 439/798 |
| 2008/0252158 A1 | 10/2008 | Yohn et al. | |
| 2012/0190251 A1 * | 7/2012 | Akuta | 439/722 |
| 2012/0225593 A1 * | 9/2012 | Akuta | 439/722 |

FOREIGN PATENT DOCUMENTS

| | | |
|---|---|---|
| DE | 1914175 | 4/1965 |
| JP | 2008-98007 | 4/2008 |

* cited by examiner

*Primary Examiner* — Alexander Gilman

(74) *Attorney, Agent, or Firm* — Gerald E. Hespos; Michael J. Porco; Matthew T. Hespos

(57) ABSTRACT

A terminal block (10) fastens conductors by placing the conductors one above another and fastening bolts and includes a plurality of nuts (30) on which the conductors are to be placed and partition walls (50) partitioning between adjacent nuts (30). Each partition wall (50) includes an insulation wall (24) provided in an insulation plate (20) arranged below the nuts (30) and a molded resin portion (60) covering the upper surface of the insulation wall (24) and the side surface of the insulation wall (24). Exposed portions (27A), which are exposed upper end parts of a projecting portion (27) provided on the insulation wall (24), are provided on the upper end surface of the molded resin portion (60).

17 Claims, 14 Drawing Sheets

TERMINAL BLOCK AND METHOD OF MOLDING IT

BACKGROUND OF THE INVENTION

1. Field of the Invention

The invention relates to a terminal block and to a method of molding a terminal block.

2. Description of the Related Art

Japanese Unexamined Patent Publication No. 2008-98007 discloses a terminal block for electrically connecting conductors, such as busbars, extending from electric devices, such as a motor and an inverter. The terminal block has a body formed by insert molding to include side by side nuts. Conductors in electric devices are placed one over another on the terminal block body and are connected electrically by fastening bolts and the nuts. Synthetic resin partition walls are formed between the nuts and extend up beyond above fastening surfaces of the nuts. The partition walls ensure electrical insulation between the respective nuts and between the conductors placed on the fastening surfaces of the nuts.

Attempts to shape the above-described terminal block by one molding can reduce insulation between the nuts and produce voids in the partition walls. Thus, an attempt to shape the terminal block by two separate moldings is being studied. Specifically, consideration is given to a primary molding to shape thin insulation walls with no voids and a secondary molding with the insulation walls arranged between the respective nuts to form partition walls having the insulation walls inside. Thus, the insulation walls formed by the primary molding reliably insulate the nuts from each other regardless of whether voids are produced in secondary molding resin. Therefore electrical insulation between the nuts can be ensured when primary molding is completed. However, the insulation walls may be inclined by injection pressure of the secondary molding. Inclined insulation walls may result in an uneven thickness of resin in the secondary molding at opposite sides of the insulation walls or may hinder the flow of the secondary molding resin. Thus, the secondary molding resin may not cover the insulation walls sufficiently, and the thin secondary molding resin may peel off.

The invention was completed in view of the above situation and an object thereof is to improve durability of a terminal block.

SUMMARY OF THE INVENTION

The invention relates to a terminal block for fastening conductors placed one above another and fastening the conductors by bolts. The terminal block has nuts on which the conductors are to be placed and partitions between adjacent nuts. The partition extends in a direction crossing an arrangement direction of the nuts and includes an insulation wall made of a primary molding resin located at least in a range in a vertical direction from the lower surfaces of the nuts to the upper surfaces of the bolts to be fastened to the nuts to ensure insulating between the adjacent nuts. A secondary molding made of a secondary molding resin fills clearances between the insulation wall and the nuts and at least partly covers the side surface of the insulation wall.

The secondary molding preferably covers the side surface of the insulation wall over substantially the entire periphery, but an exposed part of the insulation wall preferably projects up beyond the secondary molding. Accordingly, the insulation wall in the partition wall is not likely to incline and the properly aligned insulation wall is confirmed easily, thereby assuring the secondary molding resin will not peel off.

The secondary molding is formed with the adjacent nuts insulated by the insulation wall. Thus, electrical insulation between adjacent nuts is ensured reliably when the primary molding is completed. Further, the secondary molding mold fixes and covers the projection on the upper end of the insulation wall. Thus, the injection pressure of the secondary molding resin cannot incline the insulation wall and the secondary molding is formed evenly around the insulation wall. Accordingly, the secondary molding is less likely to peel off as compared with the case where the secondary molding is formed with an inclined insulation wall. Further, the exposed portion on the upper surface of the secondary molding guarantees that the insulation wall is not inclined in the partition wall. Furthermore, forming the partition in two processes, i.e. by primary molding and secondary processing reduces the likelihood of voids, as compared with the case where the partition is formed only by one molding.

The exposed portion could be a long straight part. However, resin warping and resin peel-off are likely to occur at an interface between the straight part and the secondary molding portion covering the straight part when heating and cooling are repeated, such as in a heat cycle test. Accordingly, plural exposed portions preferably are arranged in the direction crossing the arrangement direction of the nuts on the upper surface of the secondary molding. As a result, resin warping and resin peel-off can be suppressed at the interface between the exposed portions and the secondary molding.

An external force on the exposed portion could cause the exposed portion to deform away from the secondary molding and the resin may peel off at the interface between the exposed portion and the secondary molding at the side where the external force acts. Accordingly, a substantially fillet-like incline preferably is formed on the upper surface of the secondary molding and at least partly covers a base end of the exposed portion. The fillet-like incline is likely to follow deformation of the exposed portion when an external force acts on the exposed portion. Thus, the resin is not likely to peel off at the interface between the base end of the exposed portion and the incline.

The terminal block may further comprise a heat sink on a side of the nuts opposite the side where the conductors are to be placed and an insulation plate may be sandwiched between the nuts and the heat sink.

The secondary molding may at least partly cover the nuts, the insulation plate and the heat sink.

The secondary molding may include: an upper cover that closely contacts the nuts and upper ends of surrounding walls of the insulation plate, a lower cover that closely contacts a sink body of the heat sink, and a side wall that closely contacts the outer side surfaces of the insulation plate and the sink body of the heat sink.

The upper cover may be formed to fill clearances between inner peripheral surfaces of the surrounding wall of the nut accommodating recess and side surface of the respective nut. The upper cover also may comprise surrounding wall covers that at least partly cover the upper surfaces of the surrounding walls.

Substantially side by side nut accommodating recesses may be provided for receiving the nuts. A creepage distance capable of providing electrical insulation between the adjacent nut accommodating recesses is ensured only by the insulation walls.

These and other objects, features and advantages of the present invention will become more apparent upon reading of the following detailed description of preferred embodiments and accompanying drawings.

DETAILED DESCRIPTION OF THE PREFERRED EMBODIMENTS

A terminal block is identified by the number 10 in the figures and is to be mounted on a motor case to be installed in a vehicle, such as an electric vehicle or a hybrid vehicle. The terminal block 10 electrically connects busbars, such as a three-pole busbar in a motor, such as a three-phase alternating current motor, and one or more busbars, such as a three-pole busbar in an inverter.

Figure 2:
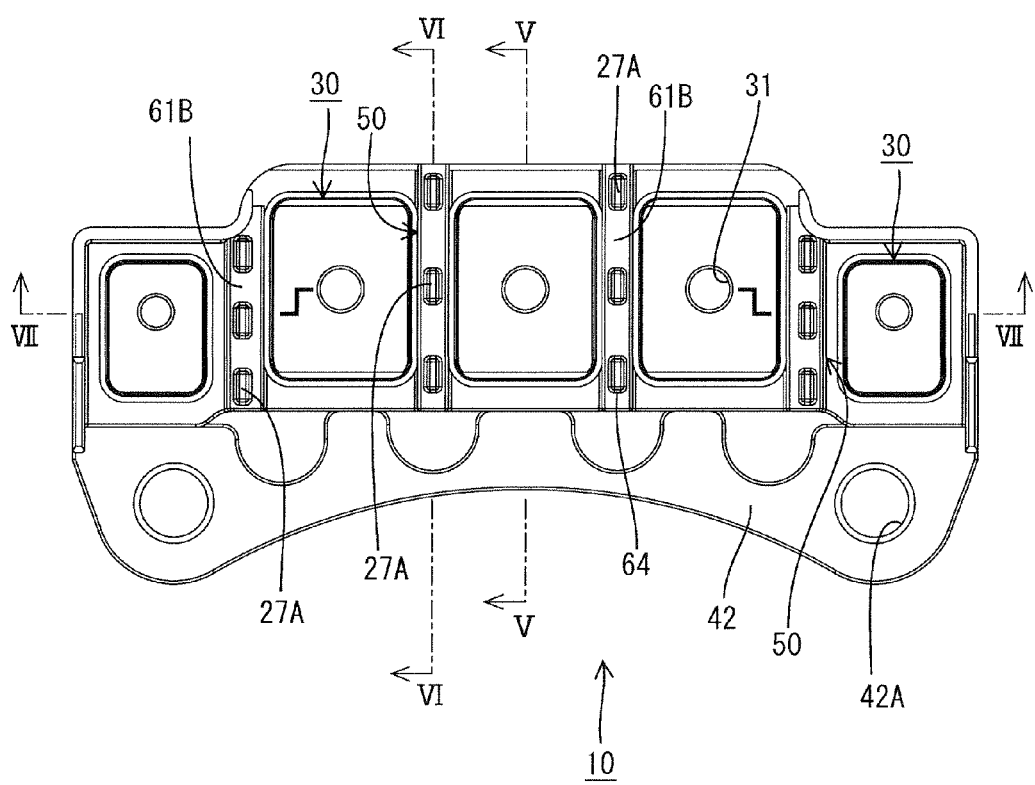
FIG. 2 is a plan view of the terminal block.
Figure 3:
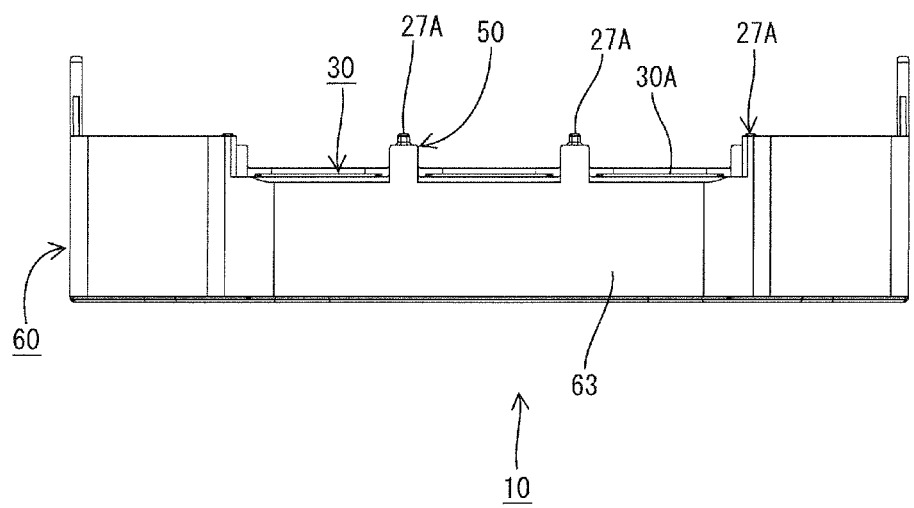
FIG. 3 is a rear view of the terminal block.

The terminal block 10 includes nuts 30 on which the busbars are to be placed. A heat sink 40 is on a side of the nuts 30 opposite the side on which the busbars are to be placed and an insulation plate 20 made e.g. of synthetic resin is sandwiched between the nuts 30 and the heat sink 40. A molded resin portion 60 at least partly covering the insulation plate 20, the nuts 30 and the heat sink 40. Heat from the busbars is transferred to the nuts 30 and then to the heat sink 40 via the insulation plate 20 and is radiated from the heat sink 40 to the motor case. In the following description, a vertical direction is based on FIG. 3 and a lateral direction is based on FIG. 2.

Figure 8:
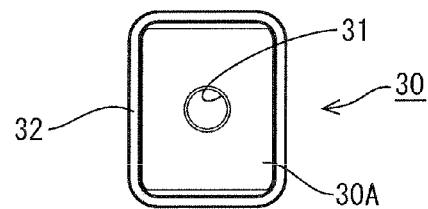
FIG. 8 is a plan view of a nut.
Figure 12:
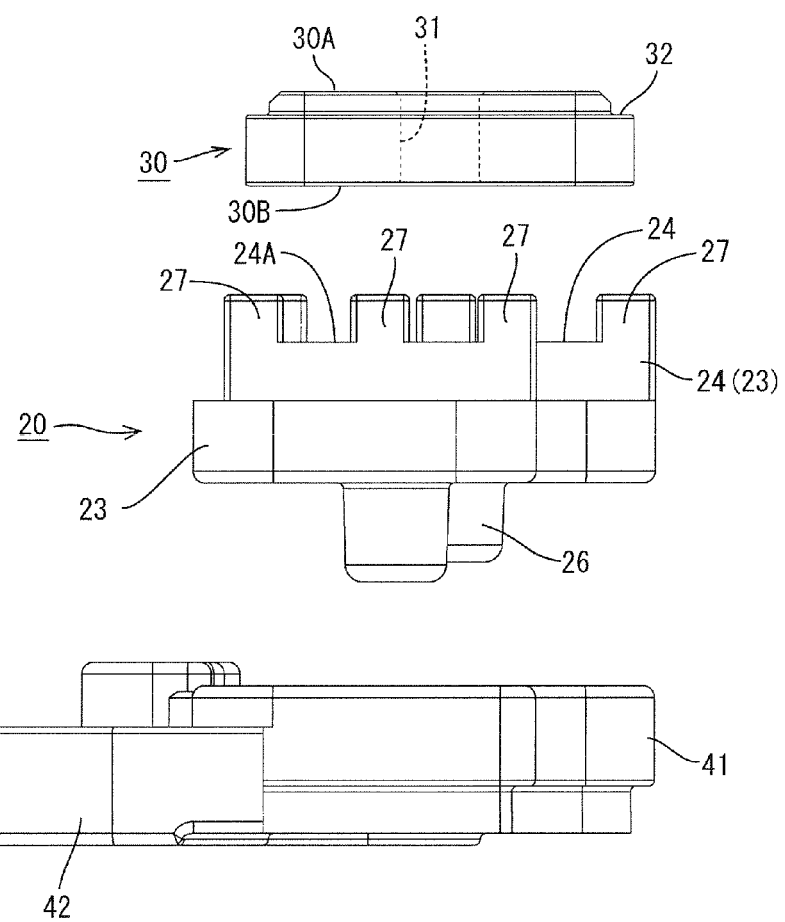
FIG. 12 is a side view showing a state where nuts, the insulation plates and the heat sink are assembled.

Each nut 30 is a substantially rectangular thermally conductive metal block with four rounded corners, as shown in FIGS. 8 and 12 and a bolt fastening hole 31 vertically penetrates a substantially central part of the nut 30. An unillustrated bolt is to be threaded into the bolt fastening hole 31 for electrically connecting unillustrated busbars placed on an upper fastening surface 30A of the nut 30.

A step 32 is formed on an outer peripheral part of an upper end portion of the nut 30 and is slightly lower than the upper fastening surface 30A of the nut 30, as shown in FIG. 12. The step 32 is provided over the entire outer periphery of the nut 30 and is substantially parallel to the upper fastening surface 30A and a lower fastening surface 30B of the nut 30. The upper fastening surface 30A, the lower fastening surface 30B and the step 32 of the nut 30 are substantially even and flat.

The insulation plate 20 is made of synthetic resin with a content of glass and talc of more than about 50% (particularly about 66%) and hence has higher thermal conductivity and a lower likelihood of warping after molding as compared with synthetic resin having a content of glass and talc of about 33%. Thus, a bottom wall 22 of the insulation plate 20 easily is held in close contact with the nuts 30. Heat from the busbars is transferred to the nuts 30 and then to the insulation plate 20 and the heat sink 40.

Figure 9:
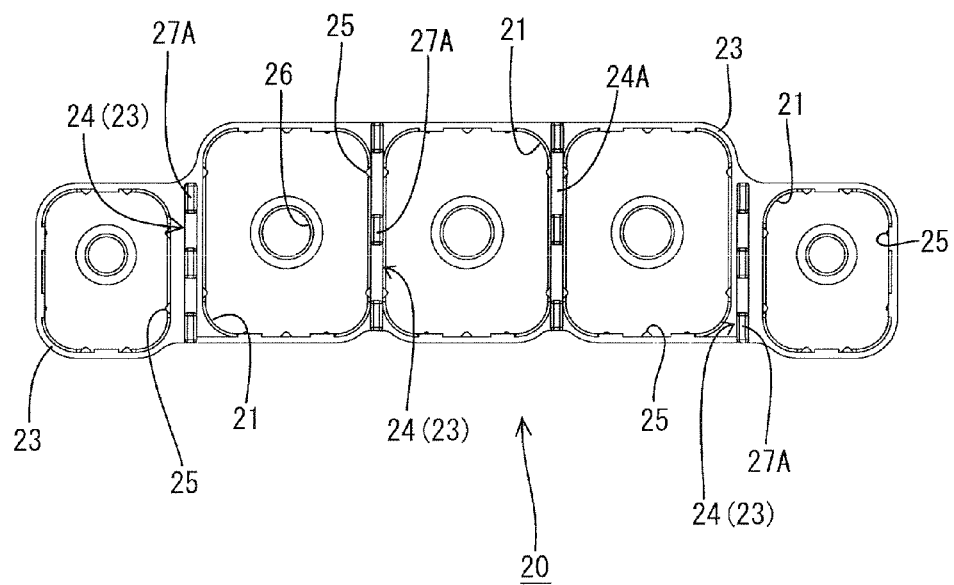
FIG. 9 is a plan view of an insulation plate.

As shown in FIG. 9, the insulation plate 20 is wide and five nut accommodating recesses 21 are arranged side by side in the lateral direction for accommodating the nuts 30.

Figure 5:
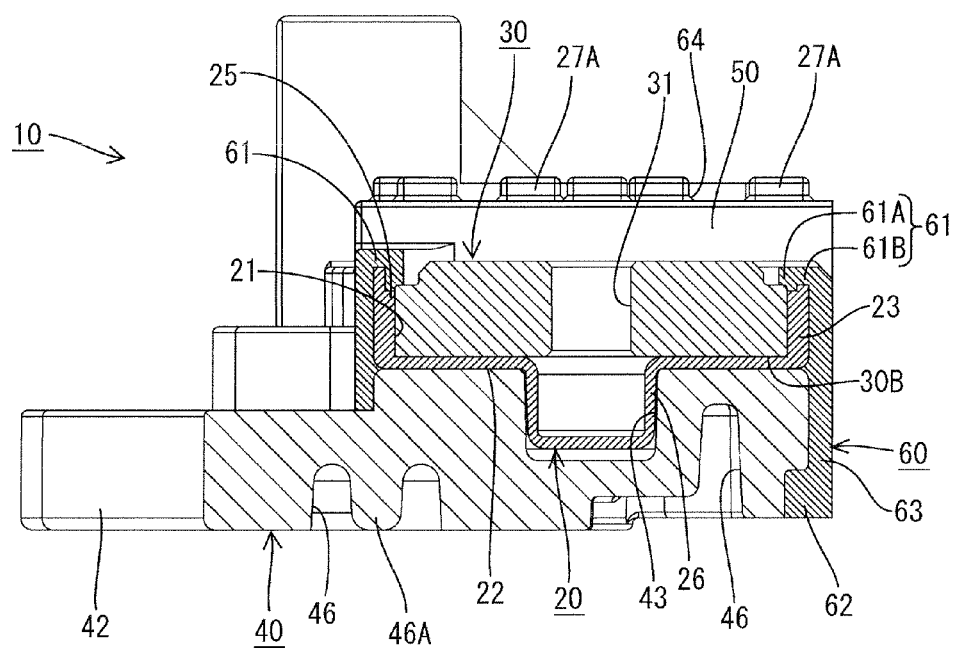
FIG. 5 is a section along V-V of FIG. 2.

Each nut accommodating recess 21 includes the bottom plate 22 for closely contacting the lower fastening surface 30B of the nut 30, as shown in FIG. 5, and a surrounding wall 23 projecting up from the bottom wall 22 to surround the side surface of the nut 30 over substantially the entire periphery. Additionally, each nut accommodating recess 21 has an open upper end that defines a substantially rectangular shape with four rounded corners, as shown in FIG. 9. The respective nut accommodating recesses 21 are formed substantially side by side so that their longer sides abut on each other.

Figure 10:
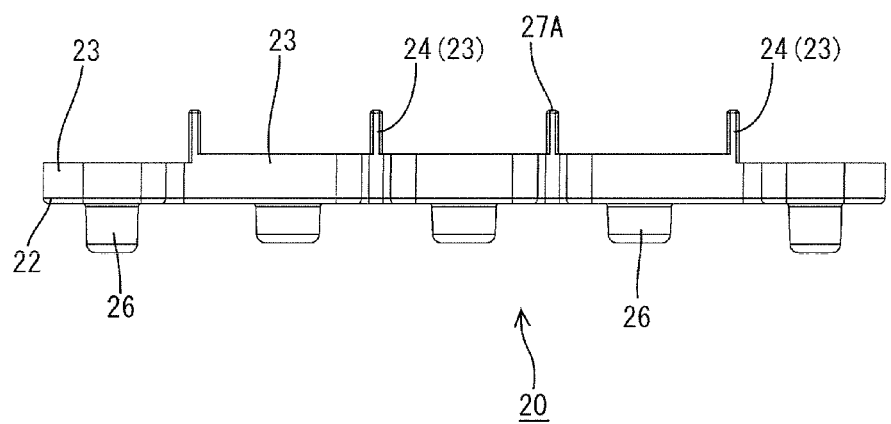
FIG. 10 is a rear view of the insulation plate.

The bottom wall 22 is a single plate common to all of the nut accommodating recesses 21, as shown in FIG. 10. Further, the upper and lower surfaces of the bottom wall 22 are substantially flat. Thus, as shown in FIG. 5, the upper surface of the bottom wall 22 and the lower fastening surface 30B of the nut 30 can be held in close contact with each other without any clearance in the nut accommodating recess 211.

As shown in FIG. 9, each surrounding wall 23 has a substantially rectangular inner peripheral shape that conforms to the outer peripheral shape of the nut 30, but is slightly larger than the outer peripheral shape of the nut 30. Thus, a tiny clearance is formed between the inner peripheral surface of the surrounding wall 23 and the side surface of the nut 30 when the nut 30 is accommodated in the nut accommodating recess 21. A part of the surrounding wall 23 between adjacent nut accommodating recesses 21 is common to both nut accommodating recesses 21 and defines an insulation wall 24 that partitions the nuts 30 in adjacent nut accommodating recesses 21.

Figure 7:
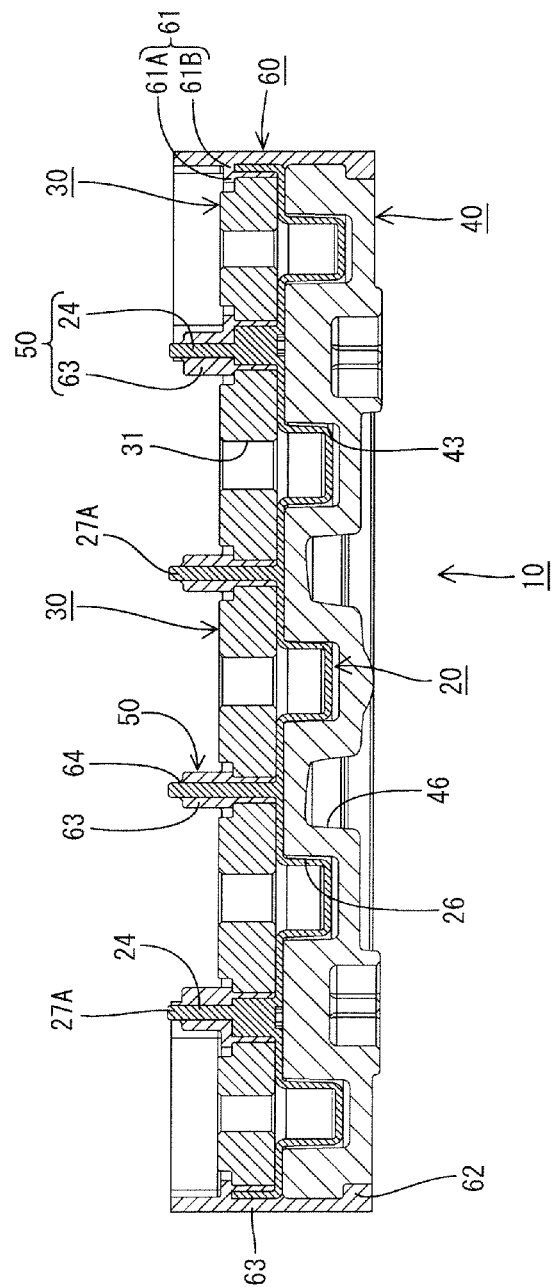
FIG. 7 is a section along VII-VII of FIG. 2.

The insulation walls 24 extend in a direction substantially perpendicular to an arrangement direction AD of the nuts 30 when the nuts 30 and the nut accommodating recesses 21. Further, the height of the insulation walls 24 is more than 1.5 times the height of the nuts 30, and preferably at least twice the height of the nuts 30, as shown in FIG. 7. The height of the insulation walls 24 is so set that the upper surfaces of the insulation walls 24 are higher than the upper surfaces of the uppermost busbars placed on the upper fastening surfaces 30A of the nuts 30 in the nut accommodating recesses 21. Further, insulation walls 24 ensure a creepage distance capable of providing electrical insulation between the adjacent nut accommodating recesses 21.

Positioning ribs 25 project into each nut accommodating recess 21 from the inner peripheral surface of each surrounding wall 23, as shown in FIG. 9. The positioning ribs 25 extend vertically straight, as shown in FIG. 5. Projecting ends of the positioning ribs 25 contact the side surface of the nut 30 in the nut accommodating recess 21. Further, the height of the positioning ribs 25 substantially equals the height of the nuts 30, as shown in FIG. 5. Accordingly, each positioning rib 25 is held in contact with the side surface of the nut 30 over substantially the entire height when the nut 30 is accommodated in the nut accommodating recess 21. In this way, the positioning ribs 25 precisely position the nuts 30 in the nut accommodating recess 21.

A bolt escaping recess 26 is formed in a central part of the bottom wall 22 surrounded by the surrounding wall 23. As shown in FIGS. 5 and 10, the bolt escaping recess 26 has a substantially cylindrical shape that makes a circular opening in the upper surface of the bottom wall 22 and/or projects downward.

As shown in FIG. 5, the bolt escaping recess 26 is substantially coaxial with the bolt fastening hole 31 of the nut 30. Thus, a bolt that is threaded into the bolt fastening hole 31 can penetrate through the bolt fastening hole 31, but will not interfere with the bottom wall 22 of the insulation plate 20 and will not break the insulation plate 20.

Figure 11:
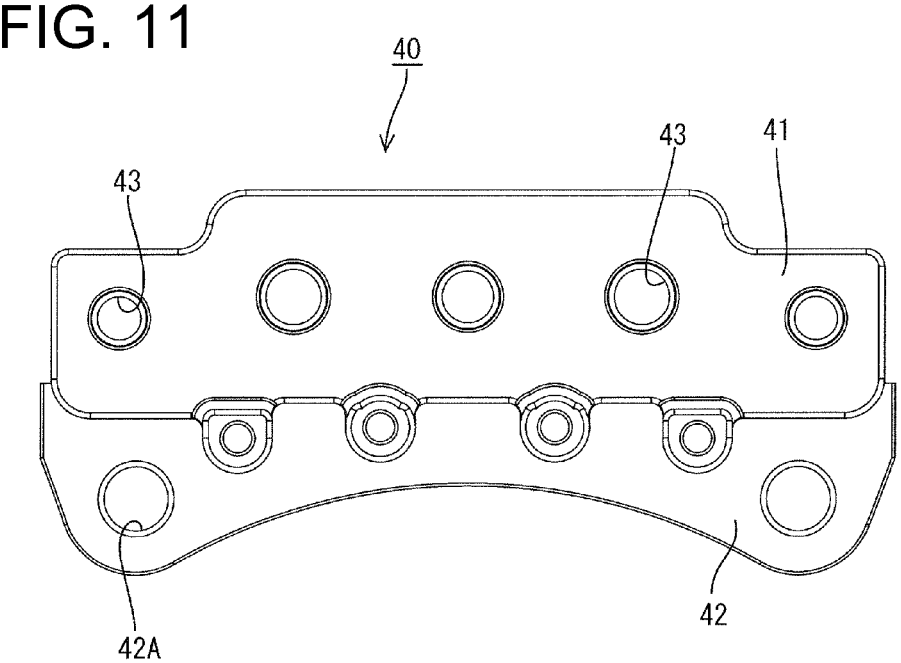
FIG. 11 is a plan view of a heat sink.

The heat sink 40 is made of aluminum die-cast or another material having a high thermal capacity and/or thermal heat conductivity and has a wide shape, as shown in FIG. 11. The heat sink 40 includes a sink body 41 on which the insulation plate 20 is to be placed, and a fixing portion 42 unitary with a lateral edge of the sink body 41.

The insulation plate 20 is to be placed on the upper surface of the sink body 41. Further, the upper surface of the sink body 41 is flat and/or polished to be free from unevenness so that the lower surface of the bottom wall 22 of the insulation plate 20 closely contacts the upper surface of the sink body 41, as shown in FIG. 5.

As shown in FIG. 11, the sink body 41 is formed with five bottomed accommodating recesses 43 arranged at substantially regular intervals or pitches in the lateral direction. As shown in FIG. 5, the accommodating recesses 43 define substantially circular openings in the upper surface of the sink body 41 and extend down from the upper surface of the sink body 41. Each accommodating recess 43 has a diameter substantially equal to the outer diameter of the bolt escaping recess 26 of the insulation plate 20 so that the bolt escaping recess 26 can fit into the accommodating recess 43. Thus the insulation plate 20 and the heat sink 40 to be assembled and positioned by fitting the bolt escaping recesses 26 into the respective accommodating recesses 43.

The fixing portion 42 is wide and bolt insertion holes 42A vertically penetrate opposite lateral ends of the fixing portion 42. Unillustrated fixing bolts are inserted into the bolt insertion holes 42A after the terminal block 10 is placed on the motor case, and are tightened to mount the terminal block 10 to the motor case.

Figure 6:
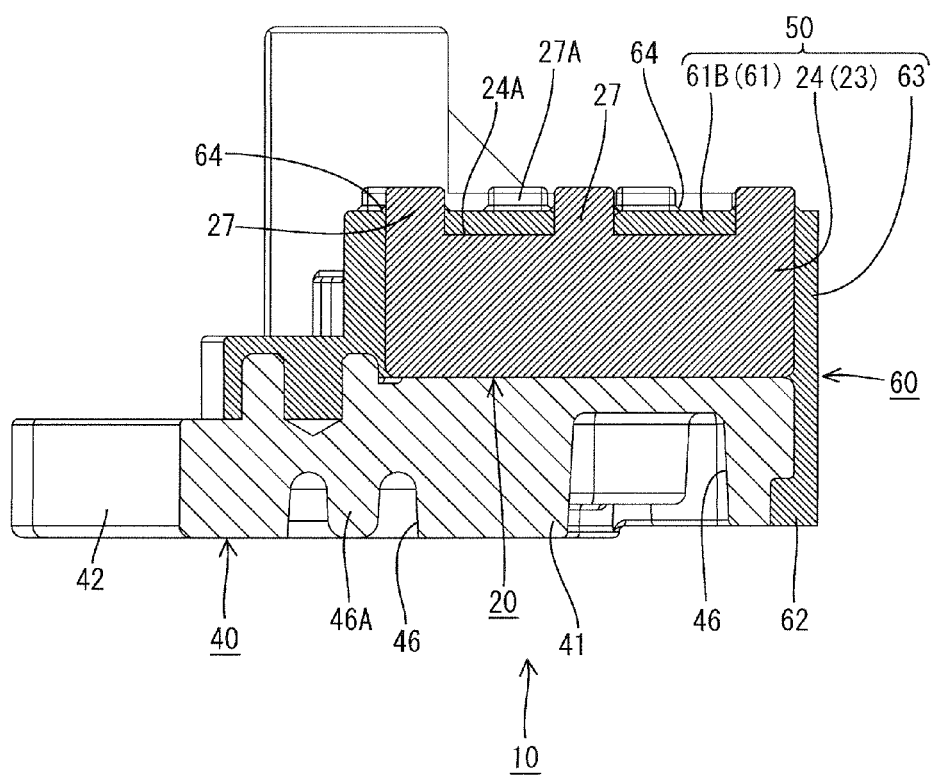
FIG. 6 is a section along VI-VI of FIG. 2.

Recesses 46 are formed in the lower surfaces of the sink body 41 and the fixing portion 42, as shown in FIGS. 5 and 6. At least one heat radiation fin 46A is formed in the recess 46 of the fixing portion 42, and a coolant (such as cooling water) can contact the fin 46A. The heat radiation fin 46A increases a contact area with the cooling water in the recess 46, efficiently cools the heat sink 40 and improves heat radiation from the heat sink 40.

As shown in FIG. 5, the molded resin portion 60 is made of secondary molding resin to at least partly cover the outsides of the insulation plate 20, the nuts 30 and the heat sink 40 that have been assembled together. The molded resin portion 60 includes an upper cover 61 that closely contacts the steps 32 of the nuts 30 and upper parts of the surrounding walls 23 of the insulation plate 20, a lower cover 62 that closely contacts a lower outer peripheral edge portion of the sink body 41 of the heat sink 40, and a side wall 63 that closely contacts outer side surfaces of the insulation plate 20 and the sink body 41 of the heat sink 40. Further, as shown in FIGS. 5 and 6, the side wall 63 unitarily joins the upper and lower covers 61, 62.

As shown in FIG. 5, the upper cover 61 comprises nut coverings 61A that at least partly cover the outer peripheral edges of the steps 32 of the respective nuts 30 over substantially the entire peripheries and surrounding wall coverings 61B at least partly covering the upper surfaces of the surrounding walls 23. The nut coverings 61A and the surrounding wall coverings 61B are formed unitarily so that the upper cover 61 covers all the nuts 30 and surrounding walls 23 together. Thus, the nuts 30 cannot be separated up from the upper surface of the insulation plate 20 by being pulled by the bolts while fastening the bolts to the nuts 30, thereby preventing a reduction in heat transfer performance of the terminal block 10.

The upper cover 61 is formed to fill up the clearances between the inner peripheral surfaces of the surrounding walls 23 of the nut accommodating recesses 21 and the side surfaces of the nuts 30. Thus, the outer peripheral edge areas of the steps 32 of the nuts 30 are held in close contact with the nut coverings 61A and the outer peripheral surfaces of the nuts 30 are held in close contact with the molded resin portion 60 over the entire peripheries to prevent upward movements of the nuts 30.

Figure 4:
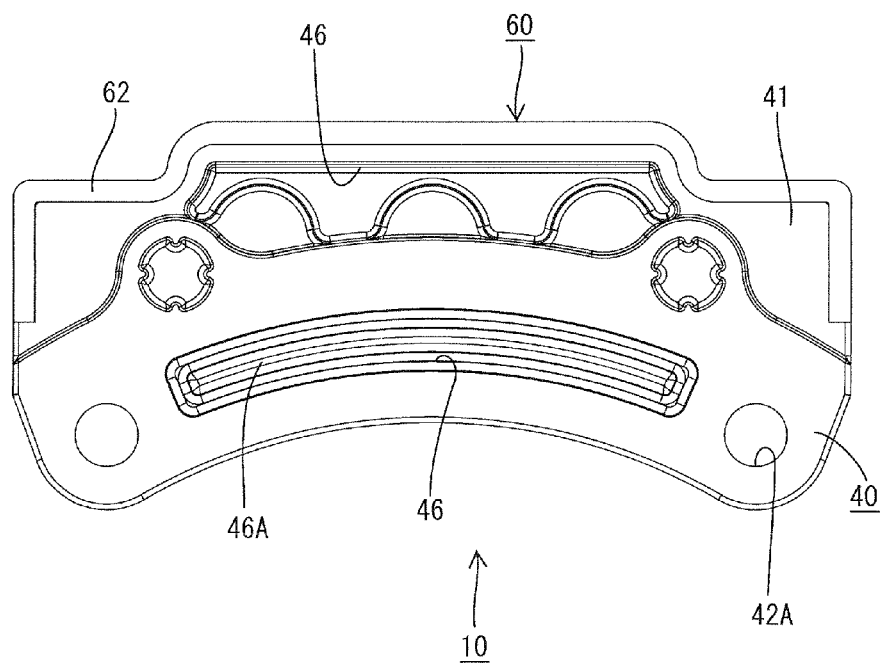
FIG. 4 is a bottom view of the terminal block.

As shown in FIGS. 4 and 5, the lower cover 62 at least partly covers the lower outer peripheral edge of the sink body 41 of the heat sink 40 from below.

As shown in FIGS. 5 and 6, the side wall 63 entirely covers the inner and outer side surfaces of the surrounding walls 23 and the side surface of the sink body 41 of the heat sink 40 between the upper and lower covers 61, 62.

The surrounding wall coverings 61B are integral with and cover upper surfaces of the insulation walls 24 of the insulation plate 20 and the side wall 63 covers the side surfaces of the insulation walls 24 over substantially the entire peripheries to form partition walls 50 that partition the respective nuts 30. Further, the side wall 63 evenly covers the side surfaces of the insulation walls 24 over substantially the entire peripheries, as shown in FIGS. 6 and 7. Thus, each partition wall 50 is formed by covering the insulation wall 24 made of primary molding resin by the surrounding wall covering 61B and the side wall 63 made of secondary molding resin so that each partition wall 50 is formed in two separate molding steps. This process suppresses production of voids in the partition wall 50 as compared with partition walls formed by one molding. Further, the insulation walls 24 are substantially evenly surrounded by the side wall 63 at all areas so that the side wall 63 will not peel off at interfaces between the insulation walls 24 and the side wall 63 as compared with the case where the insulation walls 24 are inclined in the partition walls 50 and the thickness of the side wall 63 is partly small.

Figure 1:
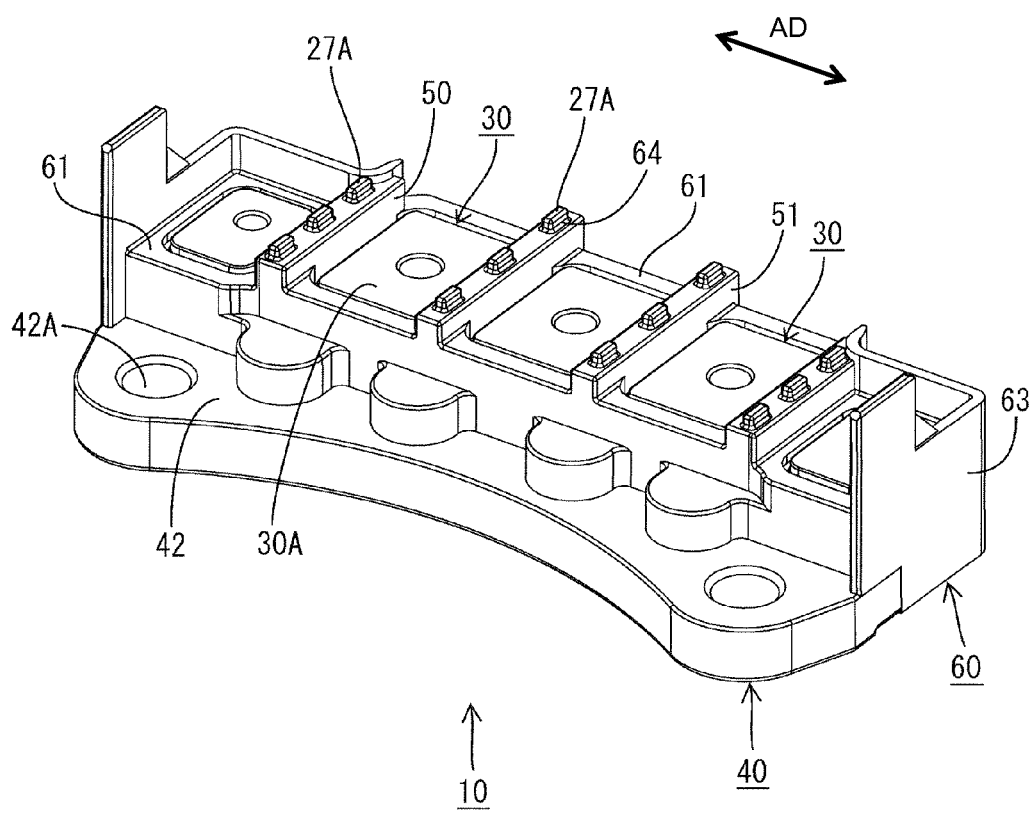
FIG. 1 is a perspective view of a terminal block.

As shown in FIGS. 1 and 5, the insulation walls 24 have exposed portions 27A on the upper end surfaces of the surrounding wall coverings 61B at the partition walls 50. The exposed portions 27A are parts of projections 27 that project up from upper end surfaces 24A of the insulation walls 24 and are exposed up from the upper end surfaces of the surrounding wall coverings 61B.

Three exposed portions 27A are formed side by side in a length direction of each insulation wall 24 and are at opposite end parts of the insulation wall 24 in the length direction and a substantially central part of the insulation wall 24 in the length direction, as shown in FIG. 9. The exposed portions 27A are upper ends of the projections 27, while lower parts of the projections 27 are covered by the surrounding wall covering 61B. Thus, three exposed portions 27A are formed on the upper end surface of the surrounding wall covering 61B suppress resin warping and resin peel-off at interfaces between the insulation wall 24 and the surrounding wall covering 61B and the side wall 63 as compared with an exposed portion having a long straight line.

As shown in FIG. 7, the exposed portions 27A are in lateral central parts on the upper end surfaces of the surrounding wall coverings 61B. Thus the insulation walls 24 are arranged at proper positions without being inclined in the partition walls 50 and the opposite left and right surfaces of the insulation walls 24 are covered by the side wall 63 with a substantially even thickness as described above. That is, the disposition of the exposed portions 27A in the lateral central parts of the upper end surfaces of the surrounding wall coverings 61B can be confirmed visually to guarantee that the insulation walls 24 are at the proper positions and are not inclined in the partition walls 50.

Figure 15:
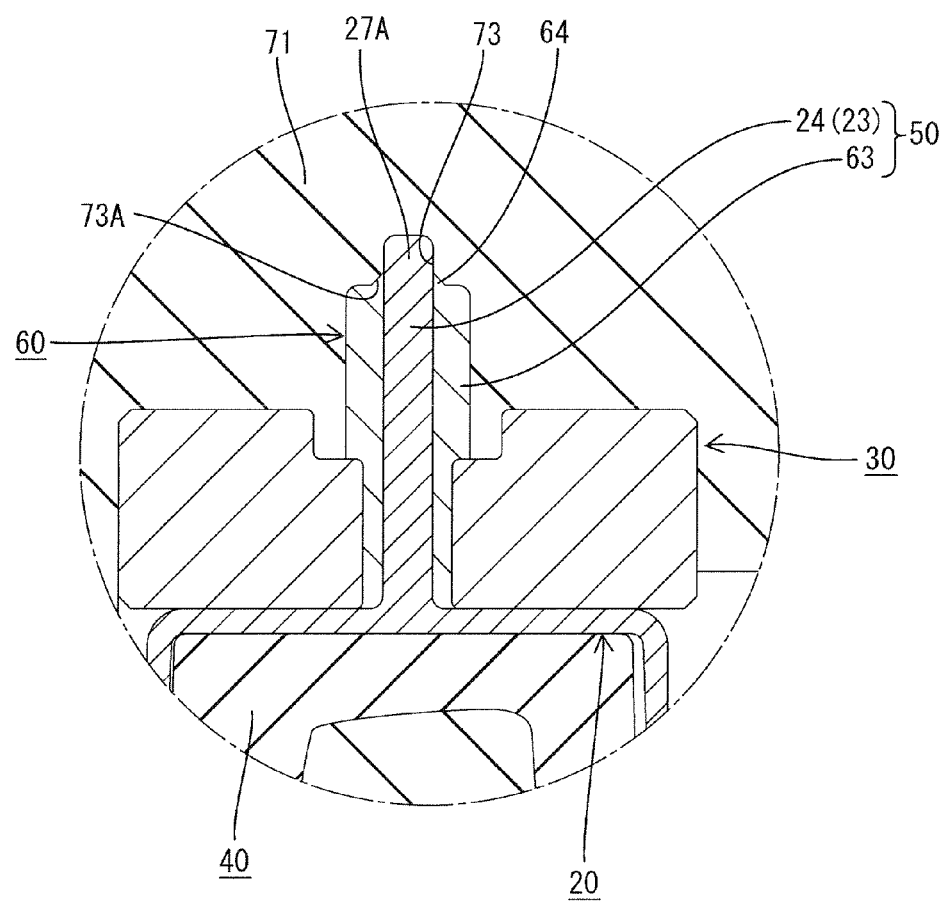
FIG. 15 is an enlarged section showing a state where an exposed portion is supported by a supporting portion in an upper mold of FIG. 14.

As shown in FIG. 15, an incline 64 is formed at a base end of the exposed portion 27A exposed from the upper end surface of the surrounding wall covering 61B and extends obliquely like a fillet from the upper end surface of the surrounding wall covering portion 61B toward the side surface of the exposed portion 27A. The incline 64 is thin and flexible, and is formed over the entire periphery between the base end of the exposed portion 27A and the upper end surface of the surrounding wall covering 61B as shown in FIGS. 6 and 7. The incline 64 closely contacts the base end of the exposed portion 27A and follows deformation of the exposed portion 27A when an external force acts on the exposed portion 27A. Accordingly, the resin will not peel-off at the interface between the base end of the exposed portion 27A and the surrounding wall covering 61B.

Figure 13:
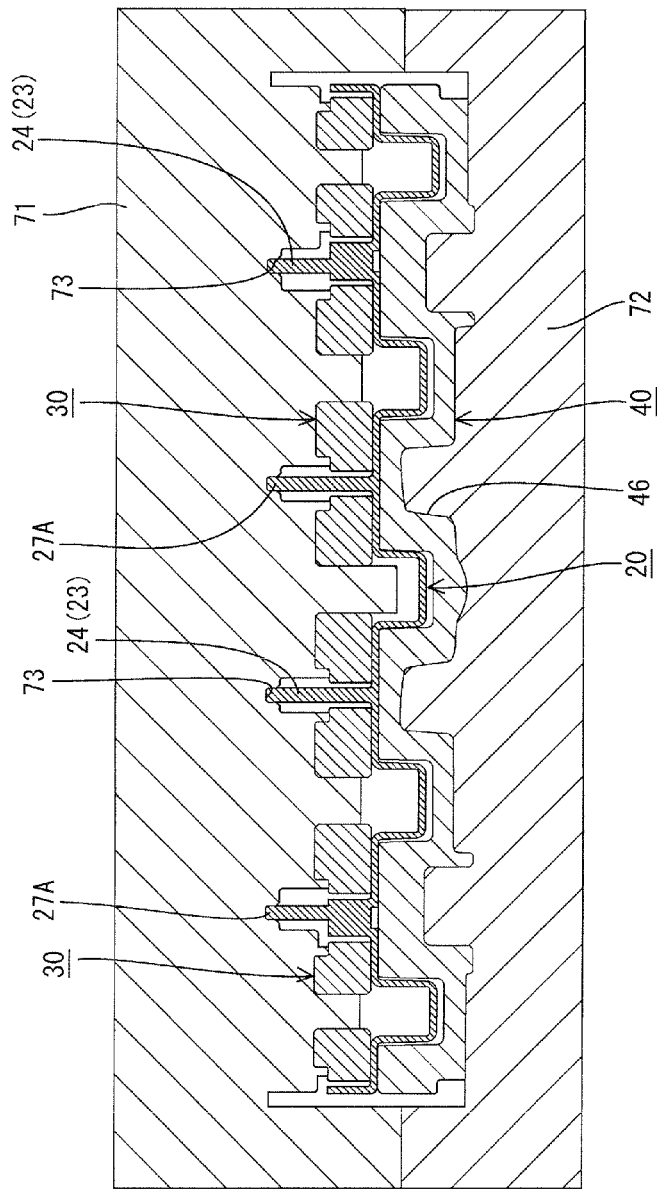
FIG. 13 is a section showing a state where the nuts, the insulation plate and the heat sink are set in a secondary molding mold.

The terminal block 10 is made by initially accommodating the nuts 30 into the nut accommodating recesses 21 of the insulation plate 20 and the bolt escaping recesses 26 of the nut accommodating recesses 21 are fit into the respective accommodating recesses 43 of the heat sink 40. The assembly of the nuts 30, the insulation plate 20 and the heat sink 40 is set in a lower mold 72. Thereafter, a movable upper mold 71 is closed with the lower mold 72 to clamp a mold as shown in FIG. 13.

The upper mold 71 includes supports 73 for supporting the upper ends of the projections 27 of the insulation plate 20, which are fit therein from above. The supports 73 are substantially rectangular recesses formed in the inner surface of the upper mold 71 and extend up. The upper ends of the projections 27 closely contact the inner surfaces of the supports 73 when the upper and lower molds 71, 72 are clamped. As shown in FIG. 15, an inclined surface 73A inclined from an inner side toward an outer side is formed over the entire periphery in an opening of each support 73. In this way, the inclined surfaces 73A guide the leading ends of the projections 27 into the supports 73 and the supports 73 support the projections 27 when the upper and lower molds 71, 72 are clamped so that the insulation walls 24 are not inclined laterally.

Figure 16:
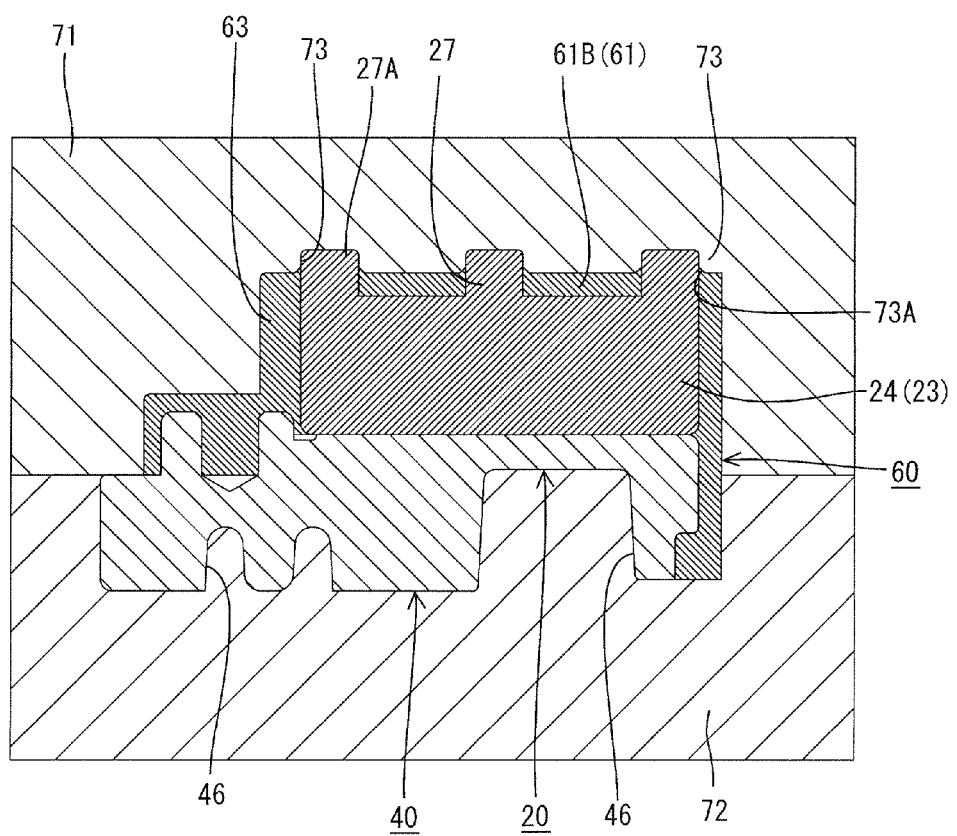
FIG. 16 is a longitudinal section showing a state after the molding resin is injected into the secondary molding mold.

On the other hand, as shown in FIG. 16, the lower mold 72 is fit into the recess 46 formed in the lower surface of the heat sink 40 to support the heat sink 40 in a positioned state. In this way, the insulation plate 20, the nuts 30 and the heat sink 40 can be held in the upper and lower molds 71, 72 while being positioned, and can be held in close contact with each other.

Figure 14:
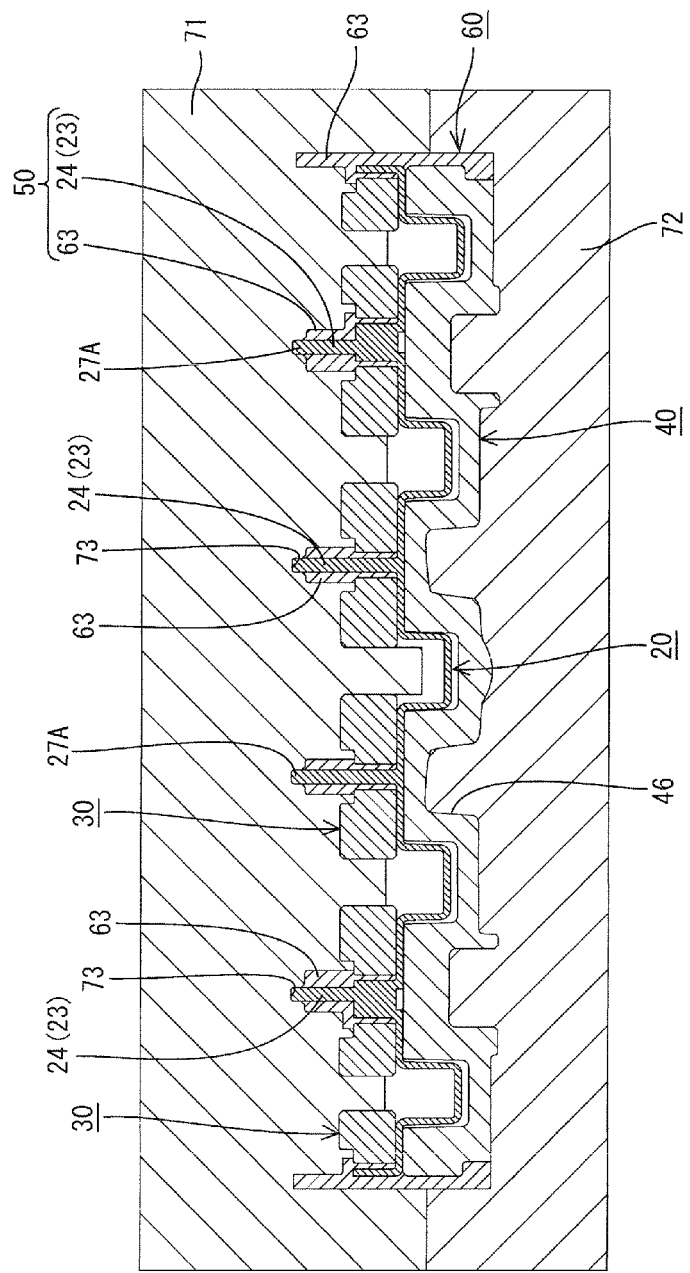
FIG. 14 is a lateral section showing a state after molding resin is injected into the secondary molding mold.

Secondary molding resin then is injected into the upper and lower molds 71, 72 to shape the molded resin portion 60 as shown in FIG. 14. At this time, the supports 73 support the upper ends of the projections 27 so that an injection pressure of the secondary molding resin will not incline the insulation walls 24 and the insulation walls 24 will be at proper positions in the partition walls 50. Thus, the surrounding wall coverings 61B and the side wall 63 covering the insulation walls 24 will not become thinner and peel off.

Side surfaces of the nuts 30 are held in contact only with the positioning ribs 25 on the inner peripheral surfaces of the surrounding walls 23 of the insulation plate 20. Thus, clearances are formed between the inner surfaces of the surrounding walls 23 and the side surfaces of the nuts 30 and the secondary molding resin can flow into these clearances.

The upper and lower molds 71, 72 are opened when the secondary molding resin is cured to complete the terminal block 10. In this state, the exposed portions 27A are exposed on the upper surfaces of the surrounding wall covering portions 61B and it can be confirmed that the insulation walls 24 are not inclined if the exposed portions 27A are in lateral central parts of the partition walls 50.

As described above, the supports 73 support the upper ends of the projections 27 so that the injection pressure of the secondary molding resin cannot incline the insulation walls 24. In this way, the secondary molding resin is less likely to peel off as compared with the case where the partition walls 50 are shaped with the insulation walls 24 inclined in the partition walls 50.

Further, the exposed portions 27A are exposed in the lateral central parts on the upper end surfaces of the surrounding wall coverings 61B. Thus, the positions of the insulation walls 24 in the partition walls 50 can be confirmed easily to guaranty that the insulation walls 24 are not inclined in the partition walls 50.

The surrounding wall cover 61B covers the upper end surface 24A of the insulation wall 24 and surround the three exposed portions 27A over substantially the entire peripheries, as shown in FIG. 16, the exposed portions 27A do not form a long straight part. This can suppress warping and peel-off of the secondary molding resin in parts around the exposed portions 27A.

Furthermore, inclined surfaces 73A of the supports 73 form the flexible inclines 64 between the exposed portions 27A and the surrounding wall covering 61B. The inclines 64 can follow the exposed portions 27A to suppress peel-off of the secondary molding resin even if an external force acts on the exposed portions 27A to deform the insulation wall 24.

The invention is not limited to the above described embodiment. For example, the following embodiments also are included in the scope of the invention.

Although heat can be radiated from below by arranging the heat sink 40 below the insulation plate 20 in this embodiment, the present invention is not limited to such a mode and can also be applied, for example, when the lower side of the insulation plate 20 is covered by the resin molded portion 60 which is made of synthetic resin.

Although three exposed portions 27A are arranged in this embodiment, the present invention is not limited to such a mode and one, two or four or more exposed portions may be arranged.

Although the incline 64 is provided over the entire periphery of the base end of the exposed portion 27A in this embodiment, the invention is not limited to such a mode and inclines may be provided only at a lateral side or at the substantially opposite lateral sides of the base end portion of the exposed portion 27A.

What is claimed is:
1. A terminal block for fastening conductors by placing the conductors one above another and fastening bolts, comprising a plurality of nuts on which the conductors are to be placed and a partition wall partitioning between the nuts adjacent to each other, the partition wall extending in a direction crossing an arrangement direction of the nuts and includes:
an insulation wall made of primary molding resin, located at least in a range in a vertical direction from the lower surfaces of the nuts to the upper surfaces of the bolts to be fastened to the nuts and insulating between the adjacent nuts, a secondary molding made of secondary molding resin, filling up clearances between the insulation wall and the nuts and at least partly covering the side surface of the insulation wall, and at least one projection projecting up from an upper end of the insulation wall and having an exposed portion exposed above an upper surface of the secondary molding.

2. The terminal block of claim 1, wherein the secondary molding covers side surfaces of the insulation wall over substantially an entire periphery.

3. The terminal block of claim 1, wherein a plurality of exposed portions are arranged in the direction crossing the arrangement direction of the nuts on the upper surface of the secondary molding.

4. The terminal block of claim 1, wherein an incline is formed on the upper surface of the secondary molding and at least partly covering a base end of the exposed portion.

5. The terminal block of claim 4, wherein the incline covers a base end portion of the exposed portion over an entire periphery.

6. The terminal block of claim 4, wherein the incline is configured to follow deformation of the exposed portion to be held in close contact with the base end of the exposed portion when an external force acts on the exposed portion.

7. The terminal block of claim 1, wherein a creepage distance between the adjacent nut accommodating recesses particularly is ensured by the insulation wall.

8. A terminal block for fastening conductors by placing the conductors one above another and fastening bolts, comprising a plurality of nuts on which the conductors are to be placed and a partition wall partitioning between the nuts adjacent to each other, the partition wall extending in a direction crossing an arrangement direction of the nuts and includes:

an insulation wall made of primary molding resin, located at least in a range in a vertical direction from the lower surfaces of the nuts to the upper surfaces of the bolts to be fastened to the nuts and insulating between the adjacent nuts, a secondary molding made of secondary molding resin, filling up clearances between the insulation wall and the nuts and at least partly covering the side surface of the insulation wall, a heat sink arranged on one side of the nuts opposite to a side where the conductors are to be placed, and an insulation plate sandwiched between the nuts and the heat sink.

9. The terminal block of claim 8, further comprising at least one projection projecting up from an upper end of the insulation wall and having an exposed portion exposed above an upper surface of the secondary molding.

10. The terminal block of claim 8, wherein the secondary molding at least partly covers the nuts, the insulation plate and the heat sink.

11. The terminal block of claim 10, wherein the secondary molding includes:

an upper cover held in close contact with the nuts and upper ends of surrounding walls of the insulation plate, a lower cover held in close contact with a sink body of the heat sink, and a side wall held in close contact with the outer side surfaces of the insulation plate and the sink body of the heat sink.

12. The terminal block of claim 11, wherein the upper covering fills up the clearances between the inner peripheral surfaces of the surrounding wall of the nut accommodating recess and the side surface of the respective nut.

13. The terminal block of claim 11, wherein the upper cover comprises surrounding wall coverings at least partly covering the upper surfaces of the surrounding walls.

14. A terminal block, comprising:

an insulation plate formed with a plurality of nut accommodating recesses arranged substantially side by side in an arrangement direction, at least one insulation wall extending substantially perpendicular to the arrangement direction and between the nut accommodating recesses that are adjacent to one another, the insulation wall having side surfaces facing into the adjacent nut accommodating recesses and a top surface, projections projecting up from the top surface of the insulation wall;

nuts accommodated respectively in the nut accommodating recesses so that clearances exist between the nuts and the insulation wall; and a secondary molding made of secondary molding resin filling the clearances between the insulation wall and the nuts and at least partly covering the side surfaces and the top surfaces of the insulation wall so that the projections project up beyond the secondary molding.

15. The terminal block of claim 14, wherein the projections on the insulation wall are spaced apart in a substantially linear array extending substantially perpendicular to the arrangement direction.

16. The terminal block of claim 15, wherein the secondary molding defines inclined fillets between the upper surface of the insulation wall and the projections.

17. A method of making a terminal block, comprising:

providing an insulation plate formed with a plurality of nut accommodating recesses arranged substantially side by side in an arrangement direction, at least one insulation wall extending substantially perpendicular to the arrangement direction and between the nut accommodating recesses that are adjacent to one another, the insulation wall having side surfaces facing into the nut accommodating recesses and a top surface, projections projecting up from the top surface of the insulation wall;

placing nuts in the respective nut accommodating recesses so that clearances exist between the nuts and the insulation wall;

closing molds around the insulation plate and the nuts so that one of the molds receives top ends of the projections of the insulation wall for securely positioning the insulation wall; and injecting a secondary molding resin between the molds to form a secondary molding filling the clearances between the insulation wall and the nuts and at least partly covering the side surfaces and the top surface of the insulation wall and base ends of the projections adjacent the top surface of the insulation wall.

* * * * *